United States Patent
Park (10) Patent No.: US 10,179,578 B2
(45) Date of Patent: Jan. 15, 2019

(54) METHOD FOR CONTROLLING BRAKING OF VEHICLE TO PREVENT JERK WHEN PARKING OR STOPPING VEHICLE

(71) Applicant: Hyundai Motor Company, Seoul (KR)

(72) Inventor: Kyun Sang Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 190 days.

(21) Appl. No.: 15/272,614

(22) Filed: Sep. 22, 2016

(65) Prior Publication Data

US 2017/0166175 A1   Jun. 15, 2017

(30) Foreign Application Priority Data

Dec. 14, 2015   (KR) .................. 10-2015-0178273

(51) Int. Cl.
| | |
|---|---|
| *B60T 8/24* | (2006.01) |
| *B60T 8/32* | (2006.01) |
| *B60T 8/00* | (2006.01) |
| *B60T 8/48* | (2006.01) |

(52) U.S. Cl.
CPC .............. *B60T 8/3205* (2013.01); *B60T 8/00* (2013.01); *B60T 8/4872* (2013.01); *B60T 2230/04* (2013.01)

(58) Field of Classification Search
CPC ...... B60T 8/3205; B60T 8/00; B60T 2230/04; B60T 8/4872
See application file for complete search history.

(56) References Cited

U.S. PATENT DOCUMENTS

| | | | | |
|---|---|---|---|---|
| 6,139,117 A | * | 10/2000 | Shirai | ..... B60T 13/74 188/1.11 R |
| 2010/0206677 A1 | * | 8/2010 | Shiraki | ..... B60T 13/741 188/325 |

FOREIGN PATENT DOCUMENTS

| | | |
|---|---|---|
| JP | 2009-40305 | 2/2009 |
| JP | 2012-061943 A | 3/2012 |
| JP | 2013-071524 A | 4/2013 |
| KR | 10-2007-0027805 | 3/2007 |
| KR | 10-2007-0106204 A | 11/2007 |
| KR | 10-2012-0059261 A | 6/2012 |
| KR | 10-2013-0107022 | 10/2013 |
| KR | 10-2013-0130950 | 12/2013 |
| KR | 10-1491408 B1 | 2/2015 |

* cited by examiner

*Primary Examiner* — Anne M Antonucci
(74) *Attorney, Agent, or Firm* — Mintz Levin Cohn Ferris Glovsky and Popeo, P.C.; Peter F. Corless (57) ABSTRACT

A method for controlling braking of a vehicle is configured to prevent a jerk which occurs when a driver removes his or her foot from a brake pedal when the vehicle is parked or stopped using a parking gear. The method is carried out such that a constant braking force is transferred to front and rear wheels, and braking pressure is gradually removed by using Electronic Stability Control (ESC) in consideration of a longitudinal direction acceleration in a state where the vehicle is parked or stopped.

10 Claims, 11 Drawing Sheets

METHOD FOR CONTROLLING BRAKING OF VEHICLE TO PREVENT JERK WHEN PARKING OR STOPPING VEHICLE

CROSS-REFERENCE TO RELATED APPLICATION

This application claims under 35 U.S.C. § 119(a) the benefit of Korean Patent Application No. 10-2015-0178273 filed on Dec. 14, 2015, the entire contents of which are incorporated herein by reference.

BACKGROUND (a) Technical Field

The present invention relates to a method for controlling braking of a vehicle to prevent jerk when parking or stopping the vehicle, more particularly, it relates to a method configured to prevent jerk that occurs when the vehicle is parked or stopped on a sloped surface using a parking brake.

(b) Description of the Related Art

If a vehicle is stopped or parked using a parking gear (P-gear), and a driver's brake pedal is in an off position, namely, when a brake pedal is no longer pressed as a driver removes his or her foot off the brake pedal, a time delay may occur due to an innate mechanical time interval until the braking force of a parking brake actually starts functioning, and accordingly the vehicle may jerk. This phenomenon is called a jerk. The jerk may be referred to as any change in a longitudinal direction acceleration, which is defined as an added acceleration.

In the analysis on a resulting motion, it is enough to consider only the acceleration. The added acceleration is normally considered when a riding comfort should be considered. In general, it is known that a person is able to withstand a jerk up to 2.0 m/s³ in the vertical direction.

Figure 1:
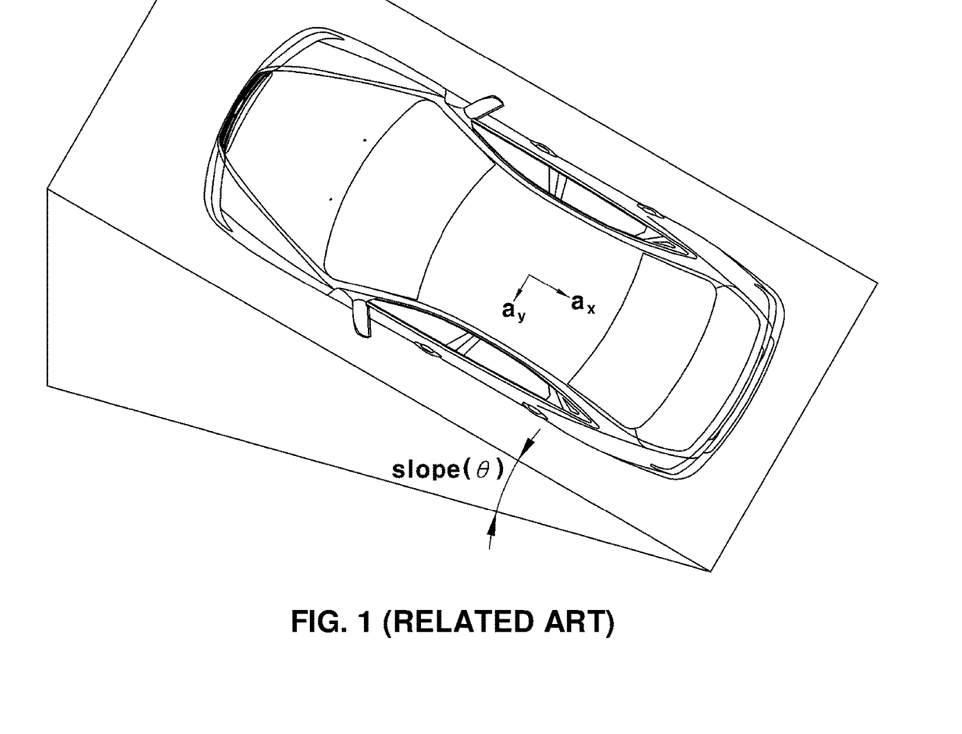
FIG. 1 (RELATED ART) is a view illustrating a vehicle which has been parked or stopped on a sloped surface and acceleration in longitudinal and lateral directions with respect to the vehicle.

As illustrated in FIG. 1 (RELATED ART), in a state where a vehicle is stopped or parked on a sloped surface using the P-gear, when a driver removes his or her foot from the brake pedal, the hydraulic pressure of four front and rear wheels, which has been generated by the brake pedal, will be reduced. At this moment, the vehicle is instantly pushed backward due to the time interval at the wheels for an effective engaging force, and the vehicle abruptly comes to stop with a jerk. In this case, the driver may feel uncomfortable as a result of the jerk.

The above information disclosed in this Background section is only for enhancement of understanding of the background of the invention and therefore it may contain information that does not form the prior art that is already known in this country to a person of ordinary skill in the art.

SUMMARY

An object of the present invention is to provide a method for controlling the braking of a vehicle to compensate a braking pressure which is removed due to the brake off before a parking brake supplies an effective braking force in consideration of a longitudinal direction acceleration in a state where the vehicle has stopped or parked.

Another object of the present invention is to provide a method for controlling the braking of a vehicle which is able to provide an improved stability when a vehicle is stopped or parked in such a way to employ both the longitudinal and lateral direction accelerations of the vehicle.

Still another object of the present invention is to provide a method for preventing a jerk in a vehicle in such a way that a constant braking force is transferred to front and rear wheels using an ESC (Electronic Stability Control) controller, and the braking pressure is gradually removed.

Yet another object of the present invention is to provide a method for controlling the braking of a vehicle which is able to provide a stability to a driver when the driver stops or parks the vehicle using the P-gear in such a way to consider an occasion where the longitudinal and lateral direction accelerations simultaneously generate since the vertical direction of the vehicle is not in parallel with the slope direction, and an occasion where a steering angle has been turned in a predetermined direction when parking or stopping the vehicle on a sloped surface.

Accordingly, in one aspect, the present invention provides a method for controlling the braking of a vehicle to prevent jerk when parking or stopping the vehicle which may include (a) checking, by an Electronic Stability Control (ESC) controller, if a vehicle is stopped on a sloped surface and a parking brake has functioned; (b) calculating, by the ESC controller, a required braking torque for each wheel in order to offset a longitudinal direction acceleration factor based on the sloped surface if the vehicle has been stopped and the parking brake has functioned; and (c) providing, by the ESC controller, the calculated required braking torque to each wheel by controlling a brake system.

In addition, there is further provided (d) detecting a steering angle before the step (b), wherein the required braking torque calculated in the step (b) is determined using a longitudinal direction acceleration, a lateral direction acceleration, and the steering angle.

Moreover, the step (b) and the step (c) are carried out only if the longitudinal direction acceleration is over a previously set first reference value or the lateral direction acceleration is over a previously set second reference value.

Furthermore, there is further provided (e) controlling a target braking pressure of each wheel to gradually decrease by gradually decreasing the required braking torque calculated in the step (b) based on a predetermined decrease rate with the aid of the ESC controller.

Furthermore, the step (e) is carried out if the required braking torque for each wheel is over a predetermined threshold value.

Furthermore, there is further provided (f) monitoring a yaw rate after the step (c) and before the step (e), and the step (e) is carried out only if the yaw rate is smaller than a previously set third reference value.

Furthermore, there is further provided (g) controlling the target braking pressure of each wheel to be maintained by maintaining the required braking torque calculated in the step (b), not reducing the required braking torque, if the yaw rate is over the third reference value.

Furthermore, if the steering angle is 0°, the required braking torques at the front and rear wheels can be determined based on the following equations:

(1) Required braking torque at front wheel $= \frac{1}{2} m a_x \dfrac{l_r - \frac{a_x}{g} h}{l_f + l_r} r$ (2) Required braking torque at rear wheel $= \frac{1}{2} m a_x \dfrac{l_f + \frac{a_x}{g} h}{l_f + l_r} r$ wherein "m" means the mass of a vehicle, "$a_x$" means a longitudinal direction acceleration, "g" means a gravity acceleration, "$l_f$" means the distance from the center of the front wheel to the center of the vehicle, "$l_r$" means the distance from the center of the rear wheel to the center of the vehicle, and "h" means the height of the vehicle.

Furthermore, if the steering angle is not 0°, and the lateral direction acceleration factor is 0, the required braking torques at the front and rear wheels are determined by the following equations:

(3) Required braking torque at front wheel = $\frac{1}{2} m a_x \cos\delta_F \frac{l_r - \frac{a_x}{g} h}{l_f + l_r} r$ (4) Required braking torque at rear wheel = $\frac{1}{2} m a_x \frac{l_f + \frac{a_x}{g} h}{l_f + l_r} r$ wherein "m" means the mass of a vehicle, "$a_x$" means a longitudinal direction acceleration, "g" means a gravity acceleration, "$l_f$" means the distance from the center of the front wheel to the center of the vehicle, "$l_r$" means the distance from the center of the rear wheel to the center of the vehicle, and "h" means the height of the vehicle, and "$\delta_F$" means the steering angle.

Furthermore, if the steering angle is not 0°, and the lateral direction acceleration factor is not 0, the required braking torques at the front and rear wheels are determined by the following equations:

(5) Required braking torque at front left wheel (FL) =

$\left( \frac{1}{2} \frac{m l_r}{l_f + l_r} - \frac{1}{2} \frac{mh}{l_f + l_r} \frac{a_x}{g} - \frac{1}{2} \frac{mh}{w} \frac{a_y}{g} \right) a_{FR,long} r$ (6) Required braking torque at front right wheel (FR) =

$\left( \frac{1}{2} \frac{m l_r}{l_f + l_r} - \frac{1}{2} \frac{mh}{l_f + l_r} \frac{a_x}{g} + \frac{1}{2} \frac{mh}{w} \frac{a_y}{g} \right) a_{FR,long} r$ (7) Required braking torque at rear left wheel (RL) =

$\left( \frac{1}{2} \frac{m l_f}{l_f + l_r} + \frac{1}{2} \frac{mh}{l_f + l_r} \frac{a_x}{g} - \frac{1}{2} \frac{mh}{w} \frac{a_y}{g} \right) a_x r$ (8) Required braking torque at rear right wheel (RR) =

$\left( \frac{1}{2} \frac{m l_f}{l_f + l_r} + \frac{1}{2} \frac{mh}{l_f + l_r} \frac{a_x}{g} + \frac{1}{2} \frac{mh}{w} \frac{a_y}{g} \right) a_x r$ wherein "m" means the mass of a vehicle, "$a_x$" means a longitudinal direction acceleration, "g" means a gravity acceleration, "$l_f$" means the distance from the center of the front wheel to the center of the vehicle, "$l_r$" means the distance from the center of the rear wheel to the center of the vehicle, and "h" means the height of the vehicle, and "$\delta_F$" means the steering angle, and "$a_y$" means the lateral direction acceleration, and "w" means the distance between the left and right wheels, and "$\delta_{FL}$" means the tire angle of the front left wheel, and "$\delta_{FR}$" means the tire angle of the front right wheel.

A non-transitory computer readable medium containing program instructions executed by a processor can include: program instructions that check if a vehicle is stopped on a sloped surface and a parking brake functions; program instructions that calculate a required braking torque for each wheel in order to offset a longitudinal direction acceleration factor based on the sloped surface if the vehicle is stopped and the parking brake functions; and program instructions that provide the calculated required braking torque to each wheel by controlling a brake system.

Other aspects and preferred embodiments of the invention are discussed infra.

According to the present invention, it is possible to prevent any jerk which may occur when a vehicle is parked or stopped using a parking brake, thereby providing stability to vehicle passengers and effectively enhancing the quality of the vehicle.

In the present invention, if a vehicle has been parked or stopped, not being lined up on a sloped surface, and it has been parked or stopped with the steering angle of the vehicle being turned in a predetermined direction, any jerk which occurs when parking or stopping the vehicle can be substantially prevented. Accordingly, it is possible to provide stability to vehicle passengers.

Moreover, the method for controlling the braking of a vehicle to prevent any jerk which normally occurs when parking or stopping the vehicle can be carried out by using the typical ESC logic without changing or adding any hardware. So, the present invention can be easily employed to the vehicles which have already been sold and are being currently used, in such a way to update the related software.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a method for controlling the braking of a vehicle to prevent any jerk which normally occurs when a vehicle driver removes his or her foot from a brake pedal when the vehicle is parked using the P-gear.

For this function, the present invention provides a method for preventing any jerk in such a way that a constant braking force is transferred to front and rear wheels using the ESC controller in consideration of a longitudinal direction acceleration in a state where the vehicle has been parked or stopped, and then a braking pressure is gradually reduced.

The present invention is able to provide stability in any situation to a vehicle driver and passenger when parking or stopping the vehicle using the P-gear in such a way to consider an occasion where both the longitudinal and lateral direction accelerations are being simultaneously generating since the vertical direction of the vehicle is not in parallel with the slope direction and an occasion where the steering angle of the vehicle has been turned when parking or stopping the vehicle on a sloped surface.

More specifically, the method for controlling the braking of a vehicle to prevent jerk when parking or stopping the vehicle according to the present invention is substantially configured to additionally supply a braking force during the above-mentioned time interval, noticing that the jerk is normally generating since the parking brake fails to provide an effective braking force when the vehicle is parked or stopped on a sloped surface. The braking torque required for each wheel of the vehicle may differ depending on the alignment of the vehicle on the sloped surface and the steering angle of the vehicle. In the present invention, the variable braking torque required for each wheel is calculated, and the braking control for each wheel is carried out by the ESC controller based on the calculated required braking torque.

The method for controlling the breaking of a vehicle to prevent any jerk when parking or stopping the vehicle according to the present invention will be described with reference to the accompanying drawings.

Figure 2:
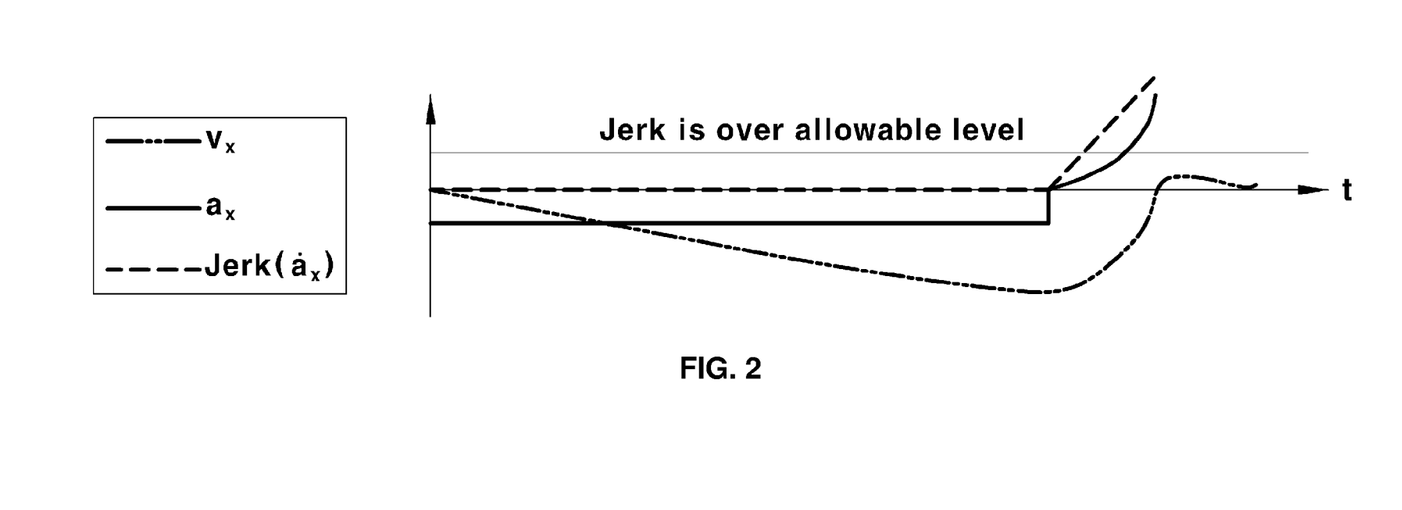
FIG. 2 is a graph showing a vehicle behavior when a jerk occurs at a vehicle.

FIG. 1 is a view illustrating a vehicle which has been parked or stopped on a sloped surface and acceleration in longitudinal and lateral directions with respect to the vehicle, and FIG. 2 is a graph showing a vehicle behavior when a jerk occurs at a vehicle.

As illustrated in FIG. 1, if a vehicle is parked or stopped on a sloped surface, the vehicle may be pushed backward with a jerk. At this time, a longitudinal direction acceleration factor and a lateral direction acceleration factor which are related to the behavior of the vehicle are present. If the vehicle is accurately aligned with the slope of the sloped surface, the lateral direction acceleration factor may be "0", and if the vehicle is not accurately aligned therewith, the lateral direction acceleration factor may be present together.

If the vehicle is parked or stopped on the sloped surface, as illustrated in FIG. 2, any change will occur at the acceleration and the added acceleration (i.e., a jerk), and thus the driver and passenger in the vehicle may feel the jerk.

Figure 3:
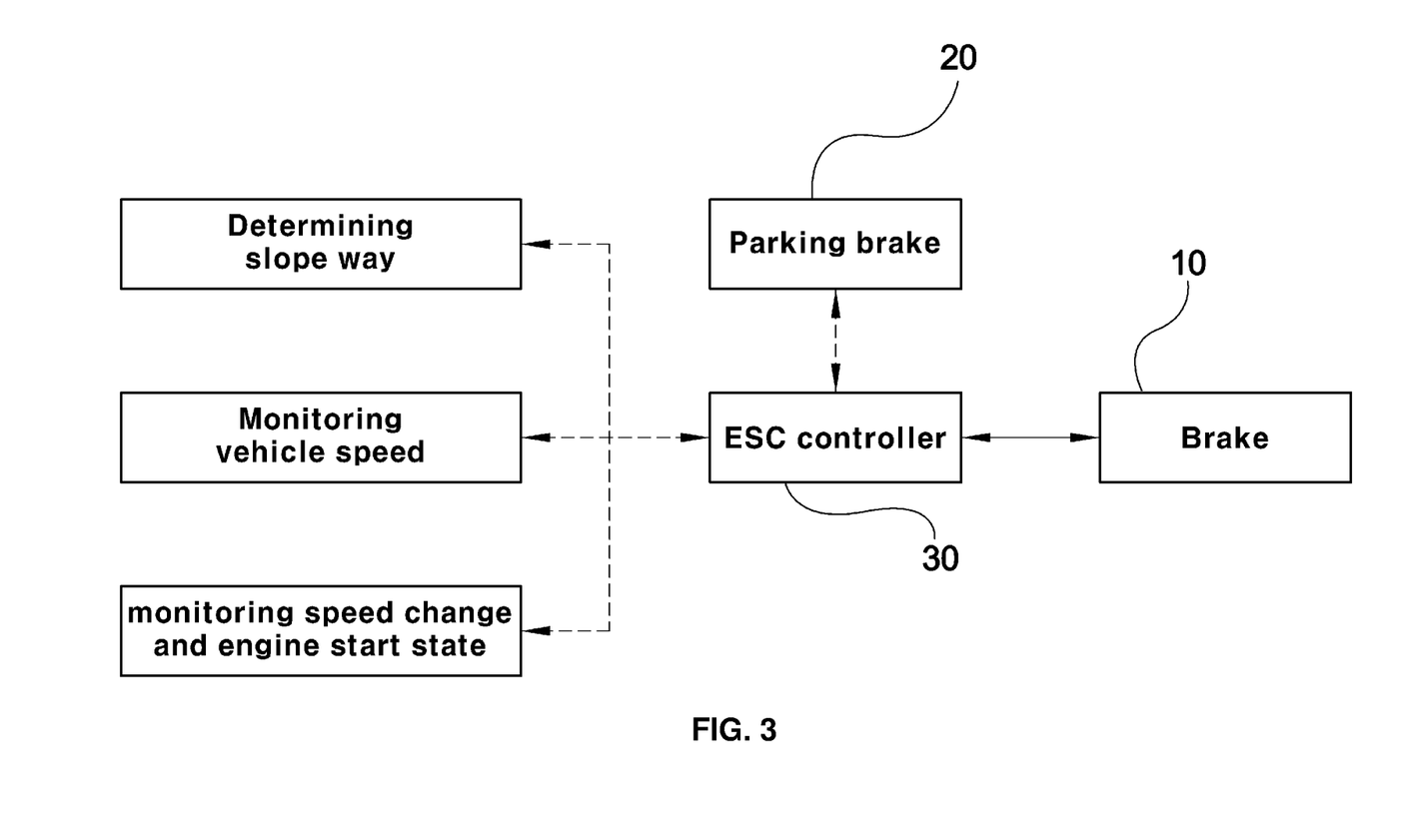
FIG. 3 is a view illustrating a configuration of a system to carry out the present invention.

FIG. 3 is a view illustrating a configuration of a system to carry out the present invention. As illustrated therein, a braking torque with respect to each wheel may be adjusted in such a way to receive an input from the parking brake and control the brake hydraulic pressure with the aid of the ESC controller.

The ESC controller is configured to monitor the vehicle speed, the transmission gears, the engine start, etc. The parking or stopping state is normally determined by checking if the parking brake has worked and based on a result of the above-mentioned monitoring. If the vehicle speed is "0", and the parking brake has worked with the transmission gear being the P-gear, it may be determined that the vehicle is currently in the parking or stopping state. The engine on/off state may be additionally considered.

Moreover, the ESC controller may carry out the control method of the present invention only in a case of the sloped surface by checking if the vehicle is parking and stopping on a sloped surface.

Therefore, if it is confirmed that the vehicle is parked or stopped on the sloped surface, the ESC controller will prevent any jerk by providing an additional braking torque to each wheel in such a way to control the brakes.

Figure 4:
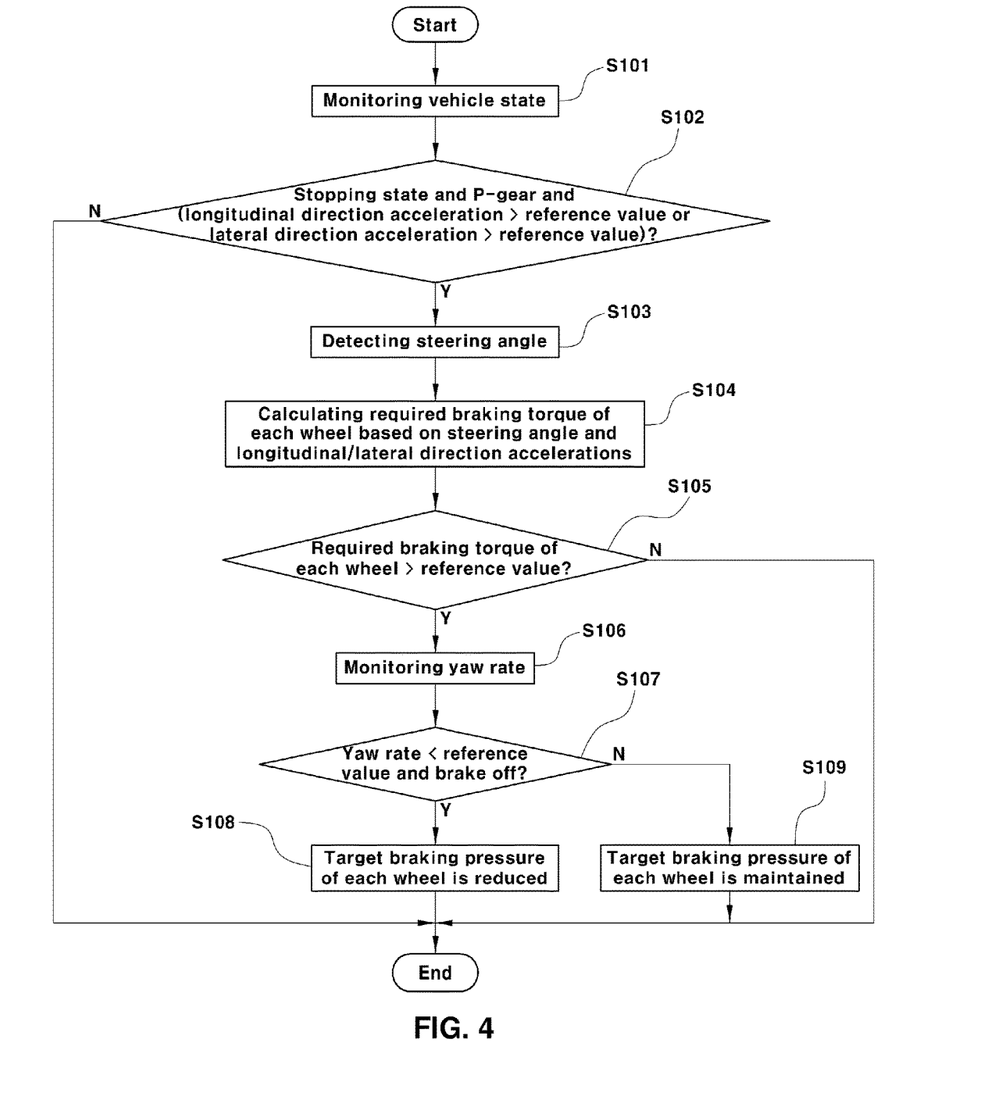
FIG. 4 is a flow chart for describing a method for controlling the braking of a vehicle to prevent any jerk when parking or stopping the vehicle according to an embodiment of the present invention.

The method for controlling the braking of a vehicle to prevent a jerk when the vehicle is parked or stopped on a sloped surface according to an embodiment of the present invention is illustrated in FIG. 4.

Referring to FIG. 4, a step (S102) is carried out, wherein it is confirmed if the vehicle has finally parked in a state where the vehicle is stopped, in such a way to monitor (S101) the state of the vehicle.

The values obtained after the monitoring by the ESC controller are a vehicle speed, transmission gears, an engine start state, a longitudinal direction acceleration, a lateral direction acceleration, etc. These values may be detected and obtained by a wheel speed sensor, an engine/transmission, a G sensor, etc.

The parking and stopping states of the vehicle can be confirmed with the aid of these vehicle state values. It is also checked if the longitudinal direction acceleration or the lateral direction acceleration is over a predetermined reference value (S102).

The longitudinal direction acceleration is a factor which may cause any jerk at the vehicle. If both the longitudinal direction acceleration and the lateral direction acceleration are smaller than a predetermined reference value, it may be judged that the jerk will not occur or the jerk will occur to the extent that it could be almost ignored, so the control will be finished.

Meanwhile, if either the longitudinal direction acceleration or the lateral direction acceleration is over the predetermined reference value, a jerk occurrence possibility might exist, so the following control will be carried out. The above reference value may be the value obtained from the experimentally verified data and is not limited to a specific value and may be adjusted, if necessary.

If the vehicle is in a parking or stopping state or if either the longitudinal direction acceleration or the lateral direction acceleration is over the reference value, the steering angle will be detected using the steering angle sensor (S103).

The detected steering angle may be used together with the longitudinal direction acceleration value during a procedure (S104) wherein the required braking torque of each wheel is calculated. The procedure wherein the required braking torque of each wheel is calculated will be described later.

If the required braking torque of each wheel is calculated, a step wherein the calculated required braking torque is compared to the reference value will be carried out (S105). In a case of a comparison step wherein the required braking torque is compared to the reference value, if a small braking torque is required, the following step may not be carried out by judging that the jerk prevention is not necessary. This step is not a necessary step like the step wherein it is checked if the longitudinal direction acceleration is over a predetermined reference value. These steps may be selectively carried out in order to prevent repeated operations.

If the required braking torque of each wheel is over the reference value, the ESC controller may provide the braking force as much as the required braking torque to each wheel by controlling the brake system.

Additionally, the ESC controller may control the brake to continuously reduce the braking force which is being transferred to each wheel (S108). In this case, the braking force will be continuously reduced since the moment when the brake input has been removed, thereby maintaining the stable parking and stopping state of the vehicle.

The braking force reduction may be set in such a way that it can be continuously reduced based on a previously set reduction rate, but the degree where the braking force is reduced may be considered a design factor which may be varied. Moreover, it is preferred that the reduction of the braking force should be carried out in such a way that all the braking force is removed during the delay time which occurs due to the gap at the parking brake.

Meanwhile, according to a preferred embodiment of the present invention, the yaw rate is monitored (S106), and the braking force may be maintained (S109) without reducing the braking force based on a result of the comparison (S107) of the current yaw rate to the reference value.

More specifically, as illustrated in FIG. 4, the ESC controller will monitor the yaw rate. If the yaw rate greatly varies, for example, if the vehicle which is parked on a turn table of a tower type parking system rotates, the stability may be enhanced by maintaining the braking force of each wheel.

As in the step S107 in FIG. 4, if it is judged that the yaw rate measured by the ESC controller is below the reference value, the typical braking force reduction step (S108) will be carried out. If the measured yaw rate is over the reference value, it needs to carry out a control to continuously maintain the breaking force of each wheel for vehicle stability (S109). It is preferred that this braking force maintaining step (S109) may be conducted until the yaw rate is reduced to below the reference value.

Figure 5:
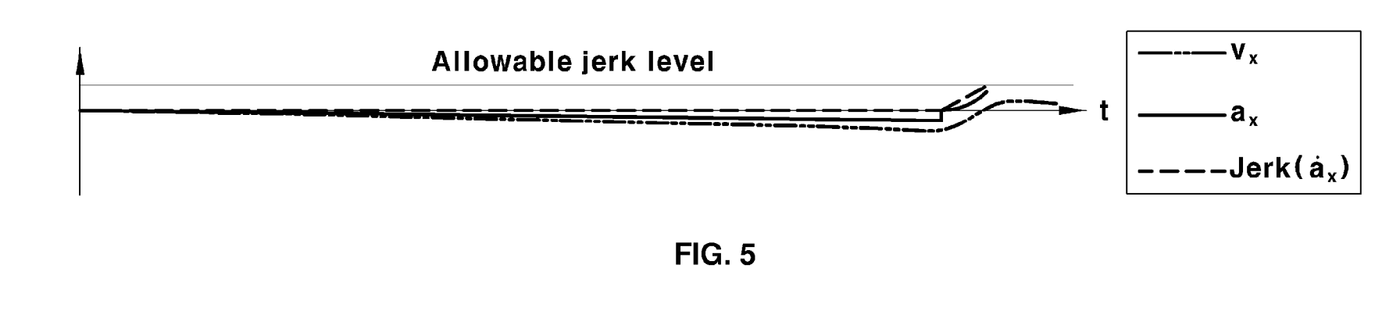
FIG. 5 is a graph showing a vehicle behavior when parking or stopping a vehicle to which a braking control method to prevent any jerk when parking or stopping the vehicle on a sloped surface according to the present invention has been applied.

FIG. 5 illustrates the vehicle behavior when the vehicle employing the braking control to prevent any vehicle jerk which may occur during the parking or stopping of the vehicle is parked or stopped on a sloped surface according to FIG. 4.

As illustrated in FIG. 5, if the braking control method of the present invention is employed, different from the occasion in FIG. 2, it is possible to buffer the braking gap of the parking brake with the aid of the braking torque which is additionally provided to each wheel, and thus the jerk can be reduced to the allowable level.

Figure 6:
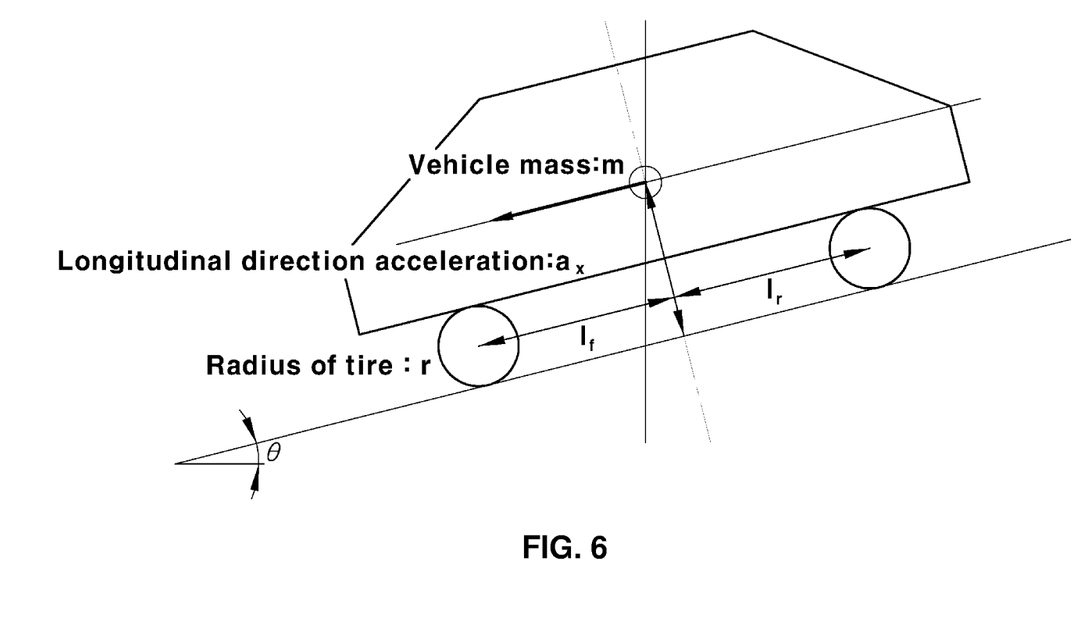
FIG. 6 is a view illustrating a state of a vehicle which has been parked or stopped on a sloped surface.

FIG. 6 is a view illustrating a vehicle which is stopped on a sloped surface while illustrating a longitudinal direction acceleration term which is transferred to the vehicle.

The method for calculating a required braking torque of each wheel together with the parameters in FIG. 6 will be described in details.

The longitudinal direction acceleration factor at the sloped surface can be detected using the G sensor installed at the vehicle. It is first assumed that the jerk will occur only due to the longitudinal direction acceleration factor. The braking torques at the front and rear wheels to offset the longitudinal direction acceleration factor may be calculated as follows.

First, the vertical weights of the front and rear wheels on the sloped surface based on the moment equilibrium may be calculated by the following equations 1 and 2.

$$\text{Vertical weight of front wheel} = \frac{1}{2}\frac{mgl_r - ma_x h}{l_f + l_r} \quad \text{[Equation 1]}$$

$$\text{Vertical weight of rear wheel} = \frac{1}{2}\frac{mgl_f + ma_x h}{l_f + l_r} \quad \text{[Equation 2]}$$

The required braking torque to prevent the jerk at the front and rear wheels in consideration of the weight movement due to the longitudinal direction acceleration will be calculated from the equations 1 and 2. For this, the mass being applied to each wheel may be calculated by dividing the vertical weight value by the gravity acceleration, and the calculated value is multiplied by the longitudinal direction acceleration of the vehicle, thereby obtaining a weight that each wheel should withstand. This value is multiplied by the radius of the wheel, thereby calculating a braking torque required for each wheel.

The calculated required braking torques at the front and rear wheels are shown in Equations 3 and 4.

$$\text{Required braking torque at front wheel} = \frac{1}{2}ma_x \frac{l_r - \frac{a_x}{g}h}{l_f + l_r}r \quad \text{[Equation 3]}$$

wherein "m" means the mass of a vehicle, "$a_x$" means a longitudinal direction acceleration, "g" means a gravity acceleration, "$l_f$" means the distance from the center of the front wheel to the center of the vehicle, "$l_r$" means the distance from the center of the rear wheel to the center of the vehicle, and "h" means the height of the vehicle (the height from the center of the wheel to the center of the vehicle).

$$\text{Required braking torque at rear wheel} = \frac{1}{2}ma_x \frac{l_f + \frac{a_x}{g}h}{l_f + l_r}r \quad \text{[Equation 4]}$$

Therefore, it is needed to transfer the required braking torques of the equations 3 and 4 to the front wheels and the rear wheels in order to offset only the longitudinal direction acceleration factors.

Figure 7:
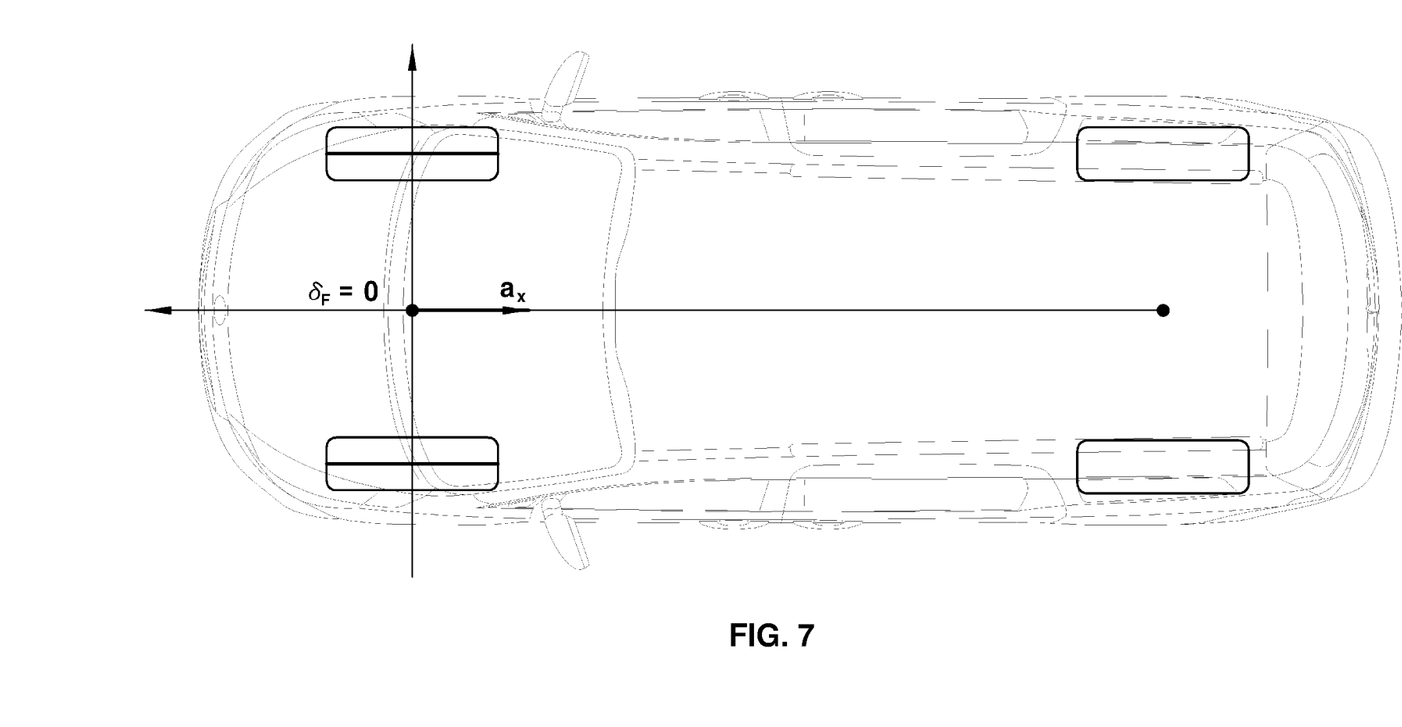
FIG. 7 is a view illustrating an occasion where a steering angle is 0° in a state where a vehicle has been parked or stopped in parallel with a slope direction of a sloped surface.

FIG. 7 illustrates an occasion where the steering angle is 0° in a state where the vehicle is being parked or stopped in parallel with the slope direction of the sloped surface. In the example in FIG. 7, the braking torques based on the equations 3 and 4 are set as the required braking torques.

This is because the lateral direction acceleration factor does not exist, and the steering angle is 0° in a case of FIG. 7. Accordingly, the calculated required braking torques are transferred to the front and rear wheels via the ESC system, thereby preventing any jerk when the vehicle is parked or stopped using the P-gear.

As described above, the situation where only the longitudinal direction acceleration is considered is limited to an occasion where, as illustrated in FIG. 7, the slope angle direction and the vehicle vertical direction match with each other, so only the longitudinal direction acceleration sensor value is present, and the lateral direction acceleration sensor value is not present. This situation is actually rare. It is common that both the longitudinal and lateral direction accelerations simultaneously occur based on the road environment and the vehicle state.

If only the longitudinal direction acceleration is considered in this situation, surplus front and rear wheel braking torques may be generated or insufficient front and rear wheel braking torques may be generated. The following result will be obtained considering the above-mentioned situations.

Moreover, many vehicle drivers tend to turn the steering angle when they park the vehicles on the sloped surface. In this case, required front wheel braking torque will be reduced.

For this reason, in the embodiment of the present invention, the required braking torque will be calculated in such a way to consider the steering angle as well as the lateral direction acceleration.

Figure 8:
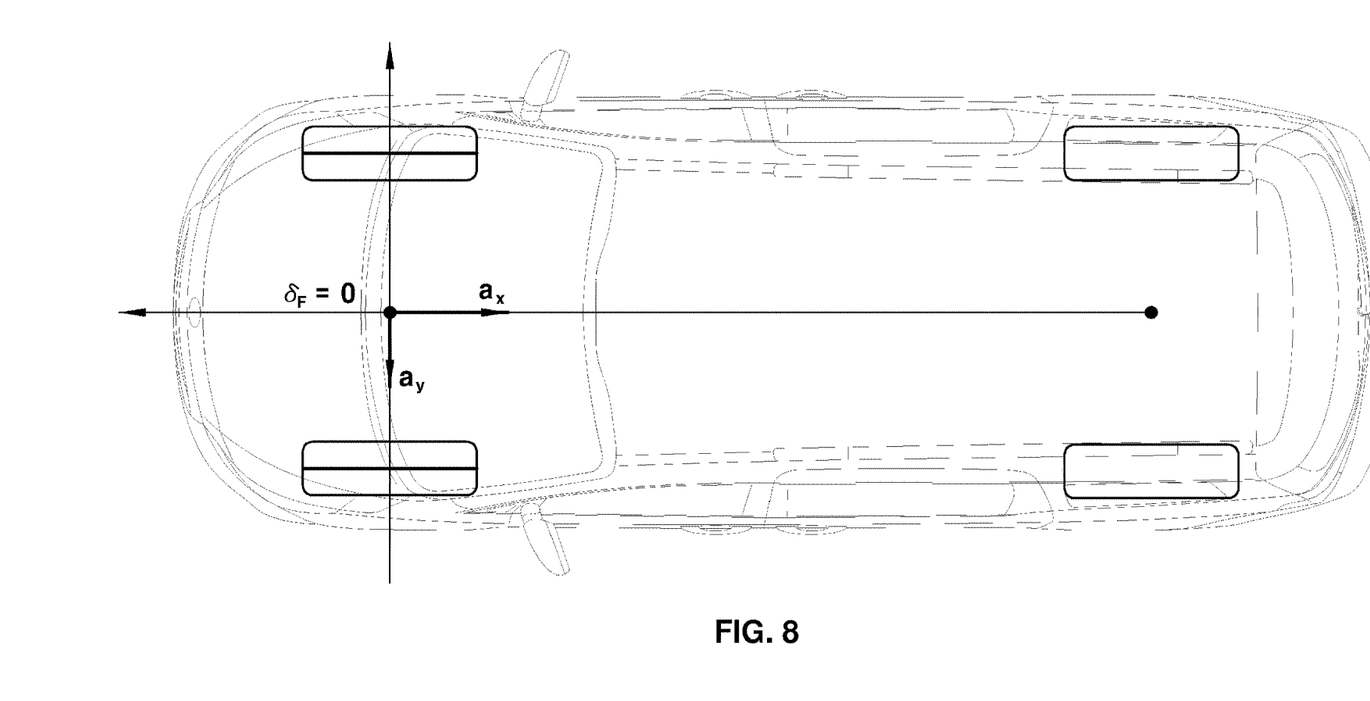
FIG. 8 is a view illustrating an occasion where a steering angle is not 0° in a state where a vehicle has been parked or stopped in parallel with a slope direction of a sloped surface.

More specifically, FIG. 8 illustrates an occasion where a steering angle is not 0° in a state where a vehicle has been parked or stopped in parallel with a slope direction of a sloped surface. In this example, the lateral direction acceleration factor does not exist, but the longitudinal direction acceleration factor at the front wheel will be reduced due to the steering angle.

$$\text{Front wheel longitudinal direction acceleration}$$
$$(a_{t,long}) = a_x \cos \delta_F \quad \text{[Equation 5]}$$

wherein $\delta_F$ means the steering angle.

Therefore, the braking torque required for the front wheel is reduced based on the steering angle, and an excessive increase in pressure by the ESC is not necessary.

$$\text{Required braking torque at front wheel} = \quad \text{[Equation 6]}$$
$$\frac{1}{2}ma_x \cos \delta_F \frac{l_r - \frac{a_x}{g}h}{l_f + l_r}r$$

In the example in FIG. 8, the required braking torque at the rear wheel is the same as in the previous equation 4.

Figure 9:
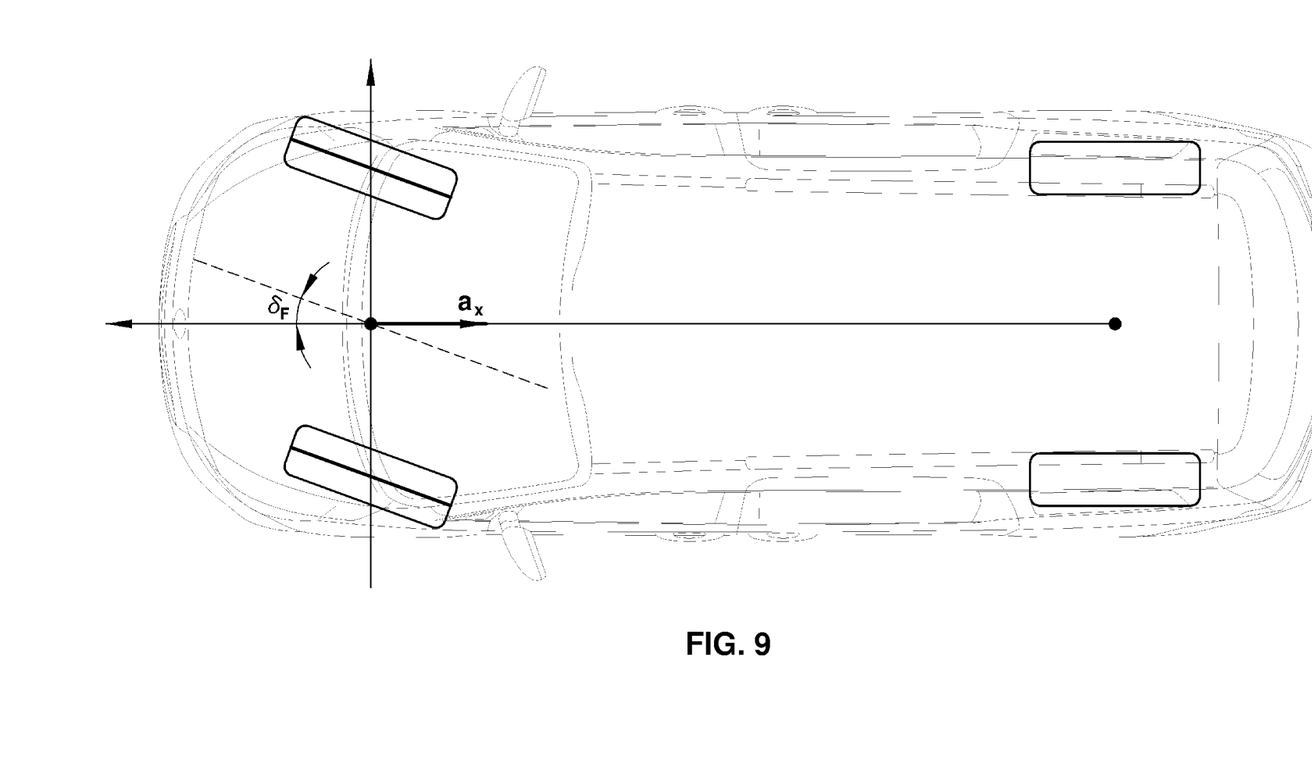
FIG. 9 is a view illustrating an occasion where a steering angle is 0° in a state where a vehicle has been parked or stopped not in parallel with a slope direction of a sloped surface.

Meanwhile, as illustrated in FIG. 9, in a case where the steering angle is 0°, and both the longitudinal and lateral direction accelerations exist, since the value of the lateral direction acceleration does not have an effect on the vertical direction force of the tire, an additional braking torque is not necessary. If the steering angle is 0°, only the required braking torque based on the longitudinal direction acceleration is enough.

Therefore, the braking torque is related to only the longitudinal direction acceleration. For this reason, the required braking torques based on the equations 3 and 4 can be calculated like in the example in FIG. 7.

Figure 10:
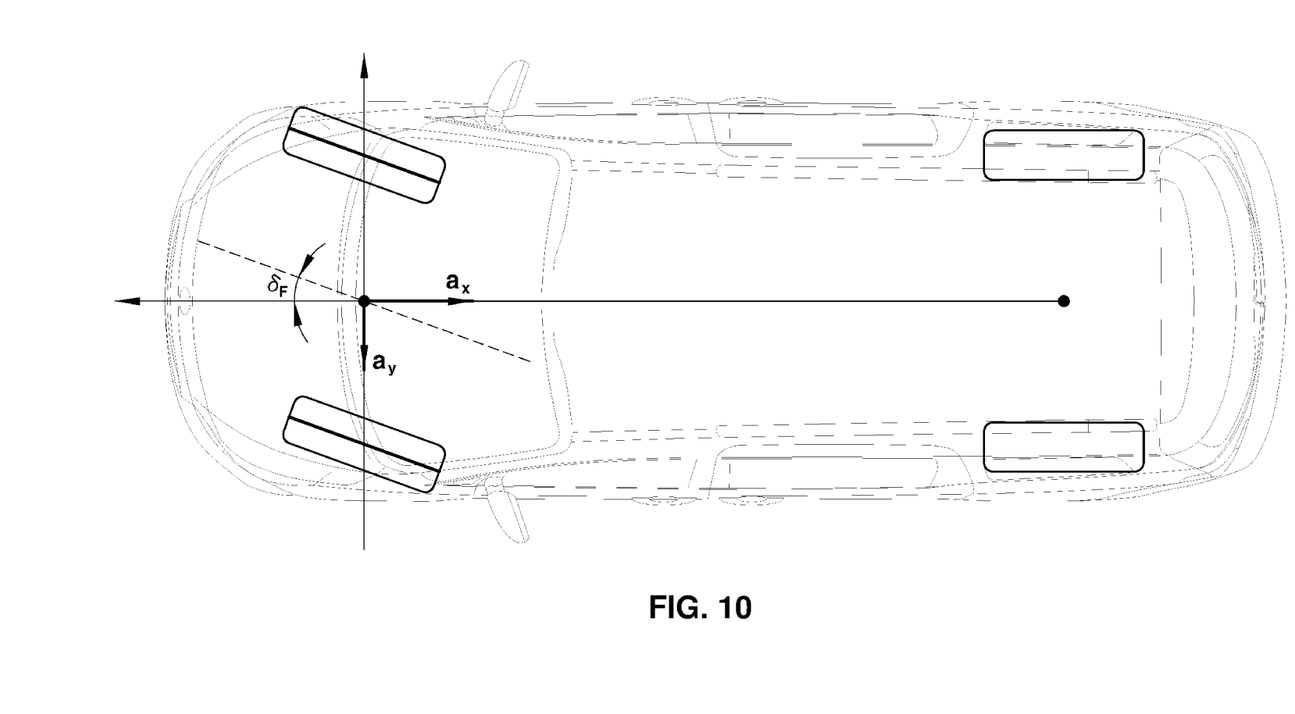
FIG. 10 is a view illustrating an occasion where a steering angle is not 0° in a state where a vehicle has been parked or stopped not in parallel with a slope direction of a sloped surface.

As illustrated in FIG. 10, if the steering angle is not 0° in a state where the vehicle has been parked or stopped not in parallel with the slope direction of the sloped surface, the steering angle, the longitudinal direction acceleration factor and the lateral direction acceleration factor should be considered together.

First, the weights transferred to four tires due to the movements of the weights by the longitudinal direction acceleration and the lateral direction acceleration based on the moment equilibrium may be calculated by the following equations 7 to 10.

$$\text{Vertical weight at front left wheel } (FL) = \quad \text{[Equation 7]}$$
$$\frac{1}{2}\frac{ml_r}{l_f + l_r} - \frac{1}{2}\frac{mh}{l_f + l_r}\frac{a_x}{g} - \frac{1}{2}\frac{mh}{w}\frac{a_y}{g}$$

-continued

Vertical weight at front right wheel $(FR) =$ [Equation 8]

$$\frac{1}{2}\frac{ml_r}{l_f+l_r} - \frac{1}{2}\frac{mh}{l_f+l_r}\frac{a_x}{g} + \frac{1}{2}\frac{mh}{w}\frac{a_y}{g}$$

Vertical weight at rear left wheel $(RL) =$ [Equation 9]

$$\frac{1}{2}\frac{ml_f}{l_f+l_r} + \frac{1}{2}\frac{mh}{l_f+l_r}\frac{a_x}{g} - \frac{1}{2}\frac{mh}{w}\frac{a_y}{g}$$

Vertical weight at rear right wheel $(RR) =$ [Equation 10]

$$\frac{1}{2}\frac{ml_f}{l_f+l_r} + \frac{1}{2}\frac{mh}{l_f+l_r}\frac{a_x}{g} + \frac{1}{2}\frac{mh}{w}\frac{a_y}{g}$$

wherein "$a_y$" means the lateral direction acceleration, and "w" means the distance between the left and right wheels.

Meanwhile, as illustrated in FIG. 10, the longitudinal direction acceleration with respect to the front wheel can be calculated by the following equation 11.

Front wheel longitudinal direction acceleration
$(a_{t,long}) = a_x \cos \delta_F + a_y \sin \delta_F$ [Equation 11]

Figure 11:
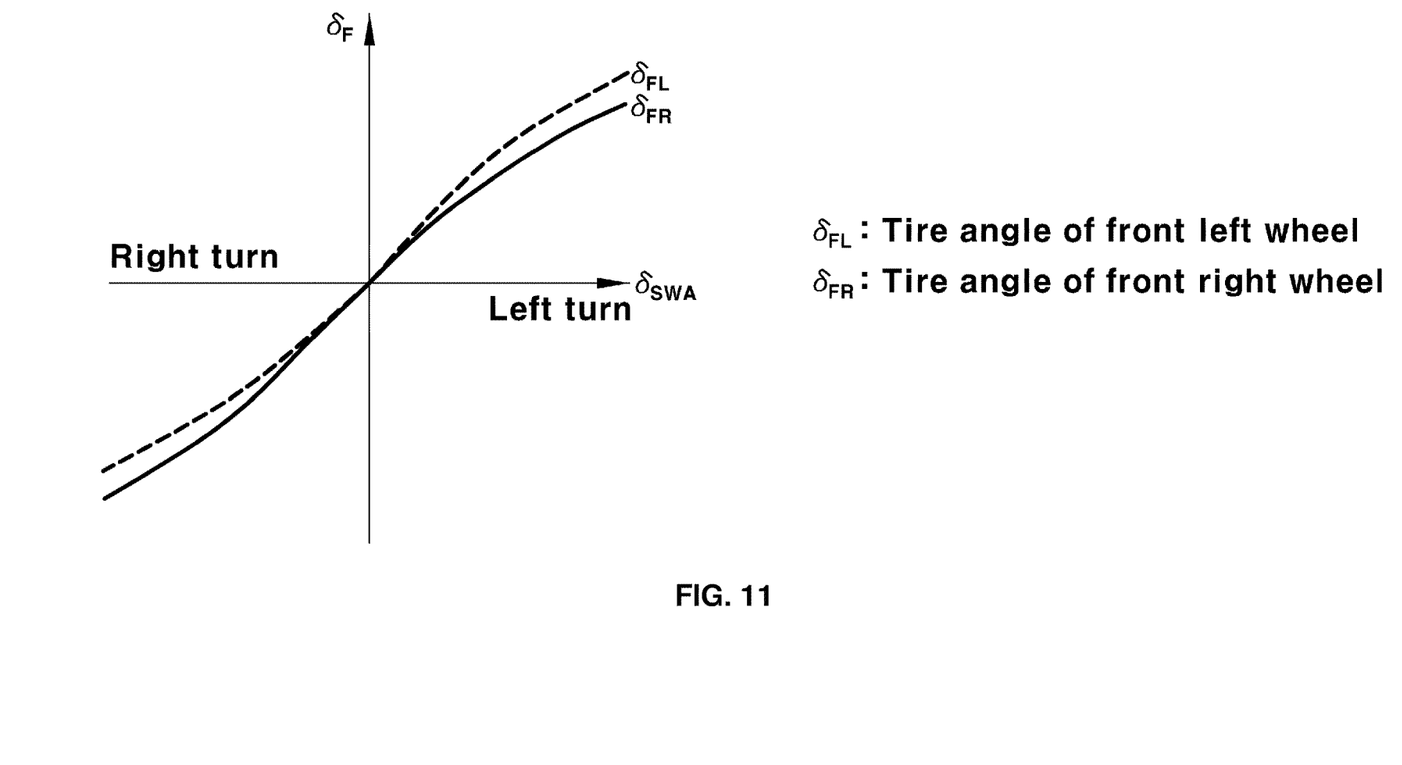
FIG. 11 is a view illustrating a characteristic curve of a steering angle and a tire angle.

The longitudinal direction acceleration transferred to the inner and outer wheel portions of the front wheels can be calculated by the following equations by using the characteristic curves of the steering angle ($\delta_{SWA}$) and the tire angle ($\delta_F$) as shown in FIG. 11.

$a_{FL,long} = a_x \cos \delta_{FL} + a_y \sin \delta_{FL}$ [Equation 12]

wherein $\delta_{FL}$ means the tire angle of the front left wheel.

$a_{FR,long} = a_x \cos \delta_{FR} + a_y \sin \delta_{FR}$ [Equation 13]

wherein $\delta_{FR}$ means the tire angle of the front right wheel.

The required braking torque with respect to each wheel can be calculated using the calculated longitudinal direction acceleration with respect to the inner and outer wheel portions of the front wheels and the equations 7 to 10.

Required braking torque at front left wheel $(FL) =$ [Equation 14]

$$\left(\frac{1}{2}\frac{ml_r}{l_f+l_r} - \frac{1}{2}\frac{mh}{l_f+l_r}\frac{a_x}{g} - \frac{1}{2}\frac{mh}{w}\frac{a_y}{g}\right)a_{FR,long}r$$

Required braking torque at front right wheel $(FR) =$ [Equation 15]

$$\left(\frac{1}{2}\frac{ml_r}{l_f+l_r} - \frac{1}{2}\frac{mh}{l_f+l_r}\frac{a_x}{g} + \frac{1}{2}\frac{mh}{w}\frac{a_y}{g}\right)a_{FR,long}r$$

Required braking torque at rear left wheel $(RL) =$ [Equation 16]

$$\left(\frac{1}{2}\frac{ml_f}{l_f+l_r} + \frac{1}{2}\frac{mh}{l_f+l_r}\frac{a_x}{g} - \frac{1}{2}\frac{mh}{w}\frac{a_y}{g}\right)a_x r$$

Required braking torque at rear right wheel $(RR) =$ [Equation 17]

$$\left(\frac{1}{2}\frac{ml_f}{l_f+l_r} + \frac{1}{2}\frac{mh}{l_f+l_r}\frac{a_x}{g} + \frac{1}{2}\frac{mh}{w}\frac{a_y}{g}\right)a_x r$$

Therefore, as illustrated in FIG. 10, even when the vehicle is parked or stopped in a state where the steering angle is not 0°, the required braking torques, which is differently set for each wheel, may be transferred based on the lateral direction acceleration factor.

According to the present invention, the jerk can be reduced to the extent that the person can ignore it by using the braking pressures of the four wheels with the aid of the ESC controller even when the vehicle is parked or stopped on the sloped surface. The jerk that the driver may feel can be removed by changing the braking force reduction patterns by using the ESC controller.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling the braking of a vehicle to prevent jerk when parking or stopping the vehicle, the method comprising:
   (a) a step of checking, by an Electronic Stability Control (ESC) controller, if a vehicle is stopped on a sloped surface and a parking brake functions;
   (b) a step of calculating, by the ESC controller, a required braking torque for each wheel in order to offset a longitudinal direction acceleration factor based on the sloped surface if the vehicle is stopped and the parking brake functions;
   (c) a step of providing, by the ESC controller, the calculated required braking torque to each wheel by controlling a brake system; and
   (e) a step of controlling, by the ESC controller, a target braking pressure of each wheel to gradually decrease by gradually decreasing the required braking torque calculated in the step (b) based on a predetermined decrease rate with the aid of the ESC controller,
   wherein a braking force provided based on the target braking pressure of each wheel is completely removed during a delay time which occurs due to a gap of the parking brake.

2. The method of claim 1, further comprising:
   (d) detecting, by the ESC controller, a steering angle before the step (b), wherein the required braking torque calculated in the step (b) is determined using a longitudinal direction acceleration, a lateral direction acceleration, and the steering angle.

3. The method of claim 2, wherein if the steering angle is 0°, the required braking torques at the front and rear wheels are determined based on the following equations:

(1) Required braking torque at front wheel $= \dfrac{1}{2}ma_x \dfrac{l_r - \dfrac{a_x}{g}h}{l_f+l_r}r$ (2) Required braking torque at rear wheel $= \dfrac{1}{2}ma_x \dfrac{l_r + \dfrac{a_x}{g}h}{l_f+l_r}r$ wherein "m" means the mass of a vehicle, "$a_x$" means a longitudinal direction acceleration, "g" means a gravity acceleration, "$l_f$" means the distance from the center of the front wheel to the center of the vehicle, "$l_r$" means the distance from the center of the rear wheel to the center of the vehicle, and "h" means the height of the vehicle.

4. The method of claim 2, wherein if the steering angle is not 0°, and the lateral direction acceleration factor is 0, the required braking torques at the front and rear wheels are determined by the following equations:

(3) Required braking torque at front wheel $= \dfrac{1}{2} m a_x \cos\delta_F \dfrac{l_r - \dfrac{a_x}{g} h}{l_f + l_r} r$ (4) Required braking torque at rear wheel $= \dfrac{1}{2} m a_x \dfrac{l_f + \dfrac{a_x}{g} h}{l_f + l_r} r$ wherein "m" means the mass of a vehicle, "$a_x$" means a longitudinal direction acceleration, "g" means a gravity acceleration, "$l_f$" means the distance from the center of the front wheel to the center of the vehicle, "$l_r$" means the distance from the center of the rear wheel to the center of the vehicle, and "h" means the height of the vehicle, and "$\delta_F$" means the steering angle).

5. The method of claim 2, wherein if the steering angle is not 0°, and the lateral direction acceleration factor is not 0, the required braking torques at the front and rear wheels are determined by the following equations:

(5) Required braking torque at front left wheel (FL) =

$\left( \dfrac{1}{2} \dfrac{m l_r}{l_f + l_r} - \dfrac{1}{2} \dfrac{m h}{l_f + l_r} \dfrac{a_x}{g} - \dfrac{1}{2} \dfrac{m h}{w} \dfrac{a_y}{g} \right) a_{FR,long} r$ (6) Required braking torque at front right wheel (FR) =

$\left( \dfrac{1}{2} \dfrac{m l_r}{l_f + l_r} - \dfrac{1}{2} \dfrac{m h}{l_f + l_r} \dfrac{a_x}{g} + \dfrac{1}{2} \dfrac{m h}{w} \dfrac{a_y}{g} \right) a_{FR,long} r$ (7) Required braking torque at rear left wheel (RL) =

$\left( \dfrac{1}{2} \dfrac{m l_f}{l_f + l_r} + \dfrac{1}{2} \dfrac{m h}{l_f + l_r} \dfrac{a_x}{g} - \dfrac{1}{2} \dfrac{m h}{w} \dfrac{a_y}{g} \right) a_x r$ (8) Required braking torque at rear right wheel (RR) =

$\left( \dfrac{1}{2} \dfrac{m l_f}{l_f + l_r} + \dfrac{1}{2} \dfrac{m h}{l_f + l_r} \dfrac{a_x}{g} + \dfrac{1}{2} \dfrac{m h}{w} \dfrac{a_y}{g} \right) a_x r$ wherein "m" means the mass of a vehicle, "$a_x$" means a longitudinal direction acceleration, "g" means a gravity acceleration, "$l_f$" means the distance from the center of the front wheel to the center of the vehicle, "$l_r$" means the distance from the center of the rear wheel to the center of the vehicle, and "h" means the height of the vehicle, and "$\delta_F$" means the steering angle, and "$a_y$" means the lateral direction acceleration, and "w" means the distance between the left and right wheels, and "$\delta_{FL}$" means the tire angle of the front left wheel, and "$\delta_{FR}$" means the tire angle of the front right wheel.

6. The method of claim 1, wherein the step (b) and the step (c) are carried out only if the longitudinal direction acceleration is over a previously set first reference value or the lateral direction acceleration is over a previously set second reference value.

7. The method of claim 1, wherein the step (e) is carried out if the required braking torque for each wheel is over a predetermined threshold value.

8. The method of claim 1, further comprising:
(f) a step of monitoring, by the ESC controller, a yaw rate after the step (c) and before the step (e), and the step (e) is carried out only if the yaw rate is smaller than a previously set third reference value.

9. The method of claim 8, further comprising:
(g) a step of controlling, by the ESC controller, the target braking pressure of each wheel to be maintained by maintaining the required braking torque calculated in the step (b), not reducing the required braking torque, if the yaw rate is over the third reference value.

10. A non-transitory computer readable medium containing program instructions executed by a processor, the computer readable medium comprising:
program instructions that check if a vehicle is stopped on a sloped surface and a parking brake functions;
program instructions that calculate a required braking torque for each wheel in order to offset a longitudinal direction acceleration factor based on the sloped surface if the vehicle is stopped and the parking brake functions;
program instructions that provide the calculated required braking torque to each wheel by controlling a brake system; and
program instructions that control a target braking pressure of each wheel to gradually decrease by gradually decreasing the required braking torque based on a predetermined decrease rate with the aid of an ESC controller,
wherein a braking force provided based on the target braking pressure of each wheel is completely removed during a delay time which occurs due to a gap of the parking brake.

* * * * *